(12) United States Patent
Anderson, Jr. et al.

(10) Patent No.: US 7,593,687 B2
(45) Date of Patent: Sep. 22, 2009

(54) SYSTEM AND METHOD FOR PROVIDING EVENT SPECTATORS WITH AUDIO/VIDEO SIGNALS PERTAINING TO REMOTE EVENTS

(75) Inventors: Tazwell L. Anderson, Jr., Atlanta, GA (US); Geoffrey L. Anderson, Atlanta, GA (US); Mark A. Wood, Decatur, GA (US)

(73) Assignee: Immersion Entertainment, LLC, Atlanta, GA (US)

( * ) Notice: Subject to any disclaimer, the term of this patent is extended or adjusted under 35 U.S.C. 154(b) by 734 days.

(21) Appl. No.: 11/070,353

(22) Filed: Mar. 2, 2005

(65) Prior Publication Data

US 2005/0210512 A1  Sep. 22, 2005

Related U.S. Application Data

(63) Continuation-in-part of application No. 10/680,612, filed on Oct. 7, 2003.

(51) Int. Cl.
*H04H 40/00* (2008.01)
*H03J 7/32* (2006.01)
(52) U.S. Cl. .................... 455/3.06; 455/145
(58) Field of Classification Search ............ 455/3.06, 455/145
See application file for complete search history.

(56) References Cited

U.S. PATENT DOCUMENTS

| | | |
|---|---|---|
| 4,472,830 A | 9/1984 | Nagai |
| 4,479,150 A | 10/1984 | Ilmer et al. |
| 4,486,897 A | 12/1984 | Nagai |
| 4,504,861 A | 3/1985 | Dougherty |
| 4,572,323 A | 2/1986 | Randall |
| 4,580,174 A | 4/1986 | Tokunaka |
| 4,605,950 A | 8/1986 | Goldberg et al. |
| 4,615,050 A | 10/1986 | Lonnstedt |

(Continued)

FOREIGN PATENT DOCUMENTS

GB    2372892    9/2002

(Continued)

OTHER PUBLICATIONS

Ron Glover; "Armchair Baseball From the Web—Or Your Stadium Seat"; copyright 1998; The McGraw-Hill Companies, Inc.; 2 pgs.

(Continued)

*Primary Examiner*—Matthew D Anderson
*Assistant Examiner*—Bobbak Safaipour
(74) *Attorney, Agent, or Firm*—Dean D. Small; The Small Patent Law Group

(57) ABSTRACT

A system and method for providing content for access by a portable device at an event are provided. The system includes an interface to receive signals from a plurality of sources. The plurality of sources are located at an event and remote from the event. The signals define event content and non-event content. The system further includes a processor for processing the received signals to generate combined signals based upon the received signals from the plurality of sources. The system also includes a transmitter for transmitting to a plurality of portable devices at the event the combined signals. The combined signals are configured to allow a user to select content using the portable device receiving the combined signals.

24 Claims, 6 Drawing Sheets

U.S. PATENT DOCUMENTS

| | | | |
|---|---|---|---|
| 4,620,068 A | 10/1986 | Wieder | |
| 4,727,585 A | 2/1988 | Flygstad | |
| 4,764,817 A | 8/1988 | Blazek et al. | |
| 4,802,243 A | 2/1989 | Griffiths | |
| 4,809,079 A | 2/1989 | Blazek et al. | |
| 4,855,827 A | 8/1989 | Best | |
| 4,856,118 A | 8/1989 | Sapiejewski | |
| 4,864,425 A | 9/1989 | Blazek et al. | |
| 4,866,515 A | 9/1989 | Tagawa et al. | |
| 4,887,152 A | 12/1989 | Matsuzaki et al. | |
| 4,965,825 A | 10/1990 | Harvey et al. | |
| 4,982,278 A | 1/1991 | Dahl et al. | |
| 5,023,707 A | 6/1991 | Briggs | |
| 5,023,955 A | 6/1991 | Murphy, II et al. | |
| 5,109,414 A | 4/1992 | Harvey et al. | |
| 5,119,442 A | 6/1992 | Brown | |
| 5,128,765 A | 7/1992 | Dingwall et al. | |
| 5,133,081 A * | 7/1992 | Mayo | 455/18 |
| 5,138,440 A | 8/1992 | Radice | |
| 5,138,722 A | 8/1992 | Urella et al. | |
| 5,173,721 A | 12/1992 | Green | |
| 5,179,736 A | 1/1993 | Scanlon | |
| 5,189,630 A | 2/1993 | Barstow et al. | |
| 5,243,415 A | 9/1993 | Vance | |
| 5,252,069 A | 10/1993 | Lamb et al. | |
| 5,289,272 A | 2/1994 | Rabowsky et al. | |
| 5,289,288 A | 2/1994 | Silverman et al. | |
| 5,321,416 A | 6/1994 | Bassett et al. | |
| 5,359,463 A | 10/1994 | Shirochi et al. | |
| 5,392,158 A | 2/1995 | Tosaki | |
| 5,408,686 A * | 4/1995 | Mankovitz | 455/66.1 |
| 5,414,544 A | 5/1995 | Aoyagi et al. | |
| 5,440,197 A | 8/1995 | Gleckman | |
| 5,448,291 A | 9/1995 | Wickline | |
| 5,463,428 A | 10/1995 | Lipton et al. | |
| 5,481,478 A | 1/1996 | Palmieri et al. | |
| 5,485,504 A | 1/1996 | Ohnsorge | |
| 5,506,705 A | 4/1996 | Yamamoto et al. | |
| 5,510,828 A * | 4/1996 | Lutterbach et al. | 725/138 |
| 5,513,384 A * | 4/1996 | Brennan et al. | 455/180.1 |
| 5,524,195 A * | 6/1996 | Clanton et al. | 725/61 |
| 5,546,099 A | 8/1996 | Quint et al. | |
| 5,585,850 A | 12/1996 | Schwaller | |
| 5,585,858 A | 12/1996 | Harper et al. | |
| 5,594,551 A | 1/1997 | Monta | |
| 5,600,365 A | 2/1997 | Kondo et al. | |
| 5,600,368 A | 2/1997 | Matthews, III | |
| 5,613,191 A | 3/1997 | Hylton et al. | |
| 5,617,331 A | 4/1997 | Wakai | |
| 5,627,915 A | 5/1997 | Rosser | |
| 5,631,693 A | 5/1997 | Wunderlich et al. | |
| 5,642,221 A | 6/1997 | Fischer et al. | |
| 5,663,717 A | 9/1997 | DeLuca | |
| 5,668,339 A | 9/1997 | Shin | |
| 5,671,320 A | 9/1997 | Cookson et al. | |
| 5,682,172 A | 10/1997 | Travers et al. | |
| 5,696,521 A | 12/1997 | Robinson et al. | |
| 5,708,961 A | 1/1998 | Hylton | |
| 5,712,950 A | 1/1998 | Cookson et al. | |
| 5,719,588 A | 2/1998 | Johnson | |
| 5,729,471 A | 3/1998 | Jain et al. | |
| 5,729,549 A | 3/1998 | Kostreski et al. | |
| 5,742,263 A | 4/1998 | Wang et al. | |
| 5,742,521 A | 4/1998 | Ellenby et al. | |
| 5,754,254 A | 5/1998 | Kobayashi et al. | |
| 5,760,819 A | 6/1998 | Sklar et al. | |
| 5,760,824 A | 6/1998 | Hicks, III | |
| 5,767,820 A | 6/1998 | Bassett et al. | |
| 5,793,416 A | 8/1998 | Rostoker et al. | |
| 5,806,005 A | 9/1998 | Hull et al. | |
| 5,808,695 A | 9/1998 | Rosser | |
| 5,812,224 A | 9/1998 | Maeda et al. | |
| 5,815,126 A | 9/1998 | Fan et al. | |
| 5,841,122 A | 11/1998 | Kirchhoff | |
| 5,844,656 A | 12/1998 | Ronzani et al. | |
| 5,847,612 A | 12/1998 | Birleson | |
| 5,847,762 A | 12/1998 | Canfield | |
| 5,867,223 A | 2/1999 | Schindler et al. | |
| 5,867,579 A | 2/1999 | Saito | |
| 5,880,773 A | 3/1999 | Suzuki | |
| 5,892,554 A | 4/1999 | DiCicco et al. | |
| 5,894,320 A | 4/1999 | Vancelette | |
| 5,900,849 A | 5/1999 | Gallery | |
| 5,903,395 A | 5/1999 | Rallison et al. | |
| 5,920,827 A | 7/1999 | Baer et al. | |
| 5,946,635 A | 8/1999 | Dominguez | |
| D413,881 S | 9/1999 | Ida et al. | |
| 5,953,076 A | 9/1999 | Astle et al. | |
| 5,982,445 A | 11/1999 | Eyer et al. | |
| 5,990,958 A | 11/1999 | Bheda et al. | |
| 5,999,808 A | 12/1999 | LaDue | |
| 6,002,720 A | 12/1999 | Yurt et al. | |
| 6,002,995 A | 12/1999 | Suzuki et al. | |
| 6,009,336 A | 12/1999 | Harris et al. | |
| 6,016,348 A | 1/2000 | Blatter et al. | |
| 6,020,851 A | 2/2000 | Busack | |
| 6,034,716 A | 3/2000 | Whiting et al. | |
| 6,035,349 A | 3/2000 | Ha et al. | |
| 6,043,837 A | 3/2000 | Driscoll, Jr. et al. | |
| 6,052,239 A | 4/2000 | Matsui et al. | |
| 6,060,995 A | 5/2000 | Wicks et al. | |
| 6,064,860 A | 5/2000 | Ogden | |
| 6,069,668 A | 5/2000 | Woodham, Jr. et al. | |
| D426,527 S | 6/2000 | Sakaguchi | |
| 6,078,954 A | 6/2000 | Lakey et al. | |
| 6,080,063 A | 6/2000 | Khosla | |
| 6,084,584 A | 7/2000 | Nahi et al. | |
| 6,088,045 A * | 7/2000 | Lumelsky et al. | 345/531 |
| 6,095,423 A | 8/2000 | Houdeau et al. | |
| 6,097,441 A | 8/2000 | Allport | |
| 6,100,925 A | 8/2000 | Rosser et al. | |
| 6,104,414 A | 8/2000 | Odryna et al. | |
| 6,112,074 A | 8/2000 | Pinder | |
| 6,121,966 A | 9/2000 | Teodosio et al. | |
| 6,124,862 A | 9/2000 | Boyken et al. | |
| 6,125,259 A | 9/2000 | Perlman | |
| 6,128,143 A | 10/2000 | Nalwa | |
| 6,131,025 A | 10/2000 | Riley et al. | |
| 6,133,946 A | 10/2000 | Cavallaro et al. | |
| 6,137,525 A | 10/2000 | Lee et al. | |
| 6,144,375 A | 11/2000 | Jain et al. | |
| 6,166,734 A | 12/2000 | Nahi et al. | |
| 6,192,257 B1 | 2/2001 | Ray | |
| 6,195,090 B1 | 2/2001 | Riggins, III | |
| 6,209,028 B1 | 3/2001 | Walker et al. | |
| 6,215,475 B1 | 4/2001 | Meyerson et al. | |
| 6,327,570 B1 | 12/2001 | Stevens | |
| 6,330,021 B1 | 12/2001 | Devaux | |
| 6,347,301 B1 | 2/2002 | Bearden, III et al. | |
| 6,351,252 B1 | 2/2002 | Atsumi et al. | |
| 6,356,905 B1 | 3/2002 | Gershman et al. | |
| 6,380,978 B1 | 4/2002 | Adams et al. | |
| 6,401,085 B1 | 6/2002 | Gershman et al. | |
| 6,417,853 B1 | 7/2002 | Squires et al. | |
| 6,421,031 B1 | 7/2002 | Ronzani et al. | |
| 6,424,369 B1 | 7/2002 | Adair et al. | |
| 6,434,403 B1 | 8/2002 | Ausems et al. | |
| 6,434,530 B1 | 8/2002 | Sloane et al. | |
| 6,463,299 B1 | 10/2002 | Macor | |
| 6,466,202 B1 | 10/2002 | Suso et al. | |
| 6,505,055 B1 | 1/2003 | Kahn et al. | |
| 6,522,352 B1 | 2/2003 | Strandwitz et al. | |
| 6,525,762 B1 | 2/2003 | Mileski et al. | |
| 6,526,580 B2 * | 2/2003 | Shimomura et al. | 725/63 |

| | | | |
|---|---|---|---|
| 6,532,152 B1 | 3/2003 | White et al. | |
| 6,535,254 B1 | 3/2003 | Olsson et al. | |
| 6,535,493 B1 | 3/2003 | Lee et al. | |
| 6,549,229 B1 | 4/2003 | Kirby et al. | |
| 6,564,070 B1 | 5/2003 | Nagamine et al. | |
| 6,567,079 B1 | 5/2003 | Smailagic et al. | |
| 6,570,889 B1 | 5/2003 | Stirling-Gallacher et al. | |
| 6,574,672 B1 | 6/2003 | Mitchell et al. | |
| 6,578,203 B1 | 6/2003 | Anderson, Jr. et al. | |
| 6,597,346 B1 | 7/2003 | Havey et al. | |
| 6,624,846 B1 | 9/2003 | Lassiter | |
| 6,669,346 B2 | 12/2003 | Metcalf | |
| 6,681,398 B1 * | 1/2004 | Verna | 725/141 |
| 6,691,398 B2 | 2/2004 | Verna | |
| 6,781,635 B1 | 8/2004 | Takeda | |
| 6,782,238 B2 | 8/2004 | Burg et al. | |
| 6,785,814 B1 | 8/2004 | Usami et al. | |
| 6,931,290 B2 | 8/2005 | Forest | |
| 6,934,510 B2 | 8/2005 | Katayama | |
| 7,006,164 B1 * | 2/2006 | Morris | 348/836 |
| 7,149,549 B1 * | 12/2006 | Ortiz et al. | 455/566 |
| 7,210,160 B2 * | 4/2007 | Anderson et al. | 725/81 |
| 7,227,952 B2 | 6/2007 | Qawami et al. | |
| 7,268,810 B2 | 9/2007 | Yoshida | |
| 2001/0016486 A1 | 8/2001 | Ko | |
| 2001/0030612 A1 | 10/2001 | Kerber et al. | |
| 2001/0034734 A1 | 10/2001 | Whitley et al. | |
| 2001/0039180 A1 | 11/2001 | Sibley et al. | |
| 2001/0039663 A1 | 11/2001 | Sibley | |
| 2001/0042105 A1 * | 11/2001 | Koehler et al. | 709/217 |
| 2001/0047516 A1 | 11/2001 | Swain et al. | |
| 2002/0007490 A1 | 1/2002 | Jeffery | |
| 2002/0014275 A1 | 2/2002 | Blatt et al. | |
| 2002/0046405 A1 | 4/2002 | Lahr | |
| 2002/0052965 A1 | 5/2002 | Dowling | |
| 2002/0057365 A1 | 5/2002 | Brown | |
| 2002/0063799 A1 | 5/2002 | Ortiz et al. | |
| 2002/0069416 A1 | 6/2002 | Stiles | |
| 2002/0069419 A1 | 6/2002 | Raverdy et al. | |
| 2002/0090217 A1 | 7/2002 | Limor et al. | |
| 2002/0091723 A1 | 7/2002 | Traner et al. | |
| 2002/0095682 A1 | 7/2002 | Ledbetter | |
| 2002/0104092 A1 | 8/2002 | Arai et al. | |
| 2002/0108125 A1 | 8/2002 | Joao | |
| 2002/0115454 A1 | 8/2002 | Hardacker | |
| 2002/0130967 A1 | 9/2002 | Sweetser | |
| 2002/0138582 A1 | 9/2002 | Chandra et al. | |
| 2002/0138587 A1 | 9/2002 | Koehler | |
| 2002/0152476 A1 | 10/2002 | Anderson et al. | |
| 2003/0004793 A1 | 1/2003 | Feuer et al. | |
| 2003/0005052 A1 | 1/2003 | Feuer et al. | |
| 2003/0005437 A1 | 1/2003 | Feuer et al. | |
| 2003/0005457 A1 | 1/2003 | Faibish et al. | |
| 2003/0014275 A1 | 1/2003 | Bearden, III et al. | |
| 2003/0023974 A1 | 1/2003 | Dagtas et al. | |
| 2003/0204630 A1 * | 10/2003 | Ng | 709/248 |
| 2004/0034617 A1 | 2/2004 | Kaku | |
| 2004/0073437 A1 | 4/2004 | Halgas et al. | |
| 2004/0207719 A1 | 10/2004 | Tervo et al. | |
| 2004/0243922 A1 | 12/2004 | Sirota et al. | |
| 2005/0076387 A1 | 4/2005 | Feldmeier | |
| 2006/0174297 A1 * | 8/2006 | Anderson et al. | 725/100 |
| 2007/0107028 A1 * | 5/2007 | Monroe et al. | 725/105 |

FOREIGN PATENT DOCUMENTS

| | | |
|---|---|---|
| JP | 10136277 | 5/1998 |
| JP | 20010275101 | 10/2001 |
| WO | WO 9411855 | 5/1994 |
| WO | WO 9966670 | 12/1999 |
| WO | WO 0054554 | 9/2000 |
| WO | WO-2004/002130 A2 | 12/2003 |

OTHER PUBLICATIONS

ChoiceSeat™ Fact Sheet; Jun. 13, 2007; 4 pgs.
ChoiceSeat—Events Operations Manual for Madison Square Garden; Dec. 15, 1999; Intel Corporation; 91 pgs.
ChoiceSeat™; www.choiceseat.net; 1999 Williams Communications; 71 pgs.
ChoiceSeat—System Adminstrator's Binder for Madison Square Garden; Dec. 17, 1999; 80 pgs.
ChoiceSeat—In Your Face Interactive Experience—1998 Superbowl; Broncos v. Packers; 15 pgs.
In-Seat Interactive Advertising Device Debuts; Nov. 19, 1999; Williams; 2 pgs.
Reality Check Studios Goes Broadband with Production for Choiceseat at Madison Square Garden; Dec. 1, 1999; 3 pgs.
Press Release: Vela Research LP to Supply Encoding for ChoiceSeat at SuperBowl XXXII; Jan. 13, 1998; 2 pgs.
Ruel's Report: ChoiceSeat; ChoiceSeat makes Worldwide Debut at the 1998 Super Bowl in San Diego California; Sep. 1, 1997; 9 pgs.
San Diego Metropolitan; Jan. 1998; 29 pgs.
Stadium fans touch the future—Internet Explorer and touch screens add interactivity to Super Bowl XXXII; Jan. 26, 1998; 2 pgs.
Telephony online Intelligence for the Broadband Economy; Fans take to ChoiceSeats: Interactive technology, e-commerce expand to sporting events; Jan. 10, 2000; 2 pgs.
Williams ChoiceSeat interactive network launches inaugural season with Tampa Bay Devil Rays; expands features for second season; Mar. 30, 1998; 2 pgs.
Williams Communications; ChoiceSeat™ demonstrates the interactive evolution of sports at Super Bowl™ XXXIII; Jan. 20, 1999; 2 pgs.
ChoiceSeat The Premiere Provider of Interactive Event Entertainment; 18 pgs.
Choice Seat Specification; Version 2.2; Ethernet Model; Williams Communications Group; Oct. 10, 1997; 13 pgs.
ChoiceSeat Intellectual Property List; 3 pgs.
CSI Incorporated Draft; Schedule A-IP; Schedule of Patents; 2 pgs.
HK-388P/PW Color Camera Operation Manual; vol. 2; Ikegami; 280 pgs.
Eric Breier; Computer age comes to ballpark; Quallcomm is test site for ChoiceSeat's sports television network; Aug. 1997; 2 pgs.
Robert Carter; Web Technology: It's in THE Game; SiteBuilder network; Dec. 15, 1997; 1 pg.
ChoiceSeat™ Fact Sheet; Project: Super Bowl XXXII; Qualcomm Stadium, San Diego, Calif., USA; Jan. 25, 1998; 1 pg.
Screen Shot Super Bowl XXXII; Jan. 25, 1998; 1 pg.
Vyvx® ChoiceSeat Cover; 1 pg.
Welcome to the Interactive Evolution of Sports. ChoiceSeat™; Jan. 1998; 1 pg.
The Ultimate Super Bowl Experience! Williams ChoiceSeat™ Jan. 1998; 1 pg.
Bradley J. Fikes; Super Bowl XXXII; It's just business; For lucky 600 fans, there'll be TV sets at the seats; San Diego North County Times; Jan. 1998; 1 pg.
D.R. Stewart; Williams Interactive Video Gives Football Fans Choice; Tulsa World; Jan. 1998; tulsaworld.com; 2 pgs.
ChoiceSeat Handout; Welcome to the Interactive Evolution of Sports. wwvv.choiceseat.net; 1 pg.
Cyberscope; Just Call It Wired Bowl; Jan. 28, 1998; 1 pg.
Ruel.Net Set-Top Page Interactive TV Top.Box.News; Ruel's Report: ChoiceSeat; Fall 1998; 7 pgs.
Williams ChoiceSeat interactive network launches inaugural season with Tampa Bay Devil Rays; expands features for second season with San Diego Padres; www.williams.com/newsroom/news_releases; Mar. 30, 1998; 2 pgs.
The Herald: Super Bowl Turns Techno Bowl; Jan. 24, 1999; 1 pg.
Williams Communications' ChoiceSeat™ demonstrates the interactive evolution of sports at Super Bowl™ XXXIII; http://www.williams.com/newsroom/news_releases; Jan. 20, 1999; 3 pgs.
NTN Interactive games available on ChoiceSeat™ during Super Bowl XXXIII; Jan. 1999; 1 pg.

Williams Fact Sheet; Super Bowl™ XXXIII; Pro Player Stadium, Miami, Florida, USA; Jan. 31, 1999; 1 pg.
Super Bowl XXXIII Game Recap; http://www.nfl.com/superbowl/history/recap/sbxxxiii; 8 pgs.
ChoiceSeat™ User Guide; New York Knicks; The Garden Fanlink; 8 pgs.
ChoiceSeat™ User Guide; New York Rangers; The Garden Fanlink; 8 pgs.
ChoiceSeat™ Flow Chart; New York Knicks; The Garden Fanlink; 1 pg.
ChoiceSeat™ Presentation Document; The "Be There" Experience; 15 pgs.
In-Seat Interactive Advertising Device Debuts; http://www.williams.com/newsroom/news_releases; Nov. 19, 1999; 2 pgs.
Intel and ChoiceSeat™ collaborate to advance interactive sports technology; http://www.williams.com/newsroom/news_releases; Nov. 29, 1999; 3 pgs.
Media Coverage; ChoiceSeat The Interactive Evolution of Sports; Good News Travels Fast.; 1 pg.
Screen Shot: ChoiceSeat The Interactive Evolution of Sports; 1 pg.
Digital Video; ChoiceSeat Coverage; www.dv.com; Apr. 2000; 11 pgs.
Wall Street Journal; With Wired Seats, Fans Get Replays, Rules, Snacks; May 21, 2000; 1 pg.
Wireless History; www.jhsph.edu/wireless/story; 5 pgs.
Wikipedia; Wireless LAN; 4 pgs.
Proposed ChoiceSeat Client Specification Summary; Initial Draft Aug. 29, 1997; Updated Sep. 30, 1997; 2 pgs.
Proposed ChoiceSeat Network Specification Summary; Initial Draft Aug. 25, 1997; 2 pgs.
Proposed ChoiceSeat Network Specification Summary; Updated Draft Sep. 30, 1997; 4 pgs.
Quallcomm Stadium ChoiceSeat Network Diagram; May 11, 1998; 5 pgs.
Schedule of Personal Property; Patents; Software and Trademarks etc Draft; 3 pgs.
PCT International Search Report dated Feb. 5, 2004; In re International Application No. PCT/US03/31696.
Written Opinion cited document in International Application No. PCT/US03/31696.
Office Action dated Aug. 10, 2007; U.S. Appl. No. 10/630,069, filed Jul. 30, 2003; Applicant: Tazwell L. Anderson, Jr.; 11 pages.
Office Action dated Aug. 23, 2007; U.S. Appl. No. 09/837,128, filed Apr. 18, 2001; Applicant: Tazwell L. Anderson, Jr.; 13 pages.
Office Action dated Sep. 7, 2007; U.S. Appl. No. 10/453,385, filed Jul. 30, 2003; Applicant: Tazwell L. Anderson, Jr.; 14 pages.
Dapeng, Wu; et al; "*On End-to-End Architecture for Transporting MPEG-4 Video Over the Internet*" IEEE Transaction vol. 10, No. 6, Sep. 2000, 19 pgs.
Capin, Tolga K., Petajen, Eric and Ostermann, Joern; "Efficient Modeling of Virtual Humans in MPEG-4" IEEE 2000, 4 pgs.
Battista, Stafano; Casalino, Franco and Lande, Claudio; "MPEG-4: A Multimedia Standard for the Third Millennium, Part 1"; IEEE 1999, 10 pgs.
Wireless Dimensions Corporation Adds to Mobile-Venue Suite™; Press Release, Wireless Dimensions; Allen, Texas; Jul. 26, 2000; www.wirelessdimensions.net/news.html, 2 pgs.
Seeing is Believing—Motorola and PacketVideoDemonstrate MPEG4 Video Over GPRS; Publication: Business Wire Date: Wednesday, May 10, 2000; www.allbusiness.com; 4 pgs.
Adamson, W.A.; Antonelli, C.J.; Coffman, K.W.; McDaniel, P.; Rees, J.; Secure Distributed Virtual Conferencing Multicast or Bust; CITI Technical Report 99-1; Jan. 25, 1999; 8 pgs.
SGI and the Pepsi Center; 2 pgs.
Office Action dated Sep. 10, 2007; U.S. Appl. No. 10/680,612, filed Oct. 7, 2003; Applicant: Tazwell L. Anderson, Jr.; 13 pages.

* cited by examiner

US 7,593,687 B2

SYSTEM AND METHOD FOR PROVIDING EVENT SPECTATORS WITH AUDIO/VIDEO SIGNALS PERTAINING TO REMOTE EVENTS

CROSS REFERENCE TO RELATED APPLICATIONS

This application is a continuation-in-part and claims priority to copending Non-Provisional U.S. patent application entitled "SYSTEM AND METHOD FOR PROVIDING EVENT SPECTATORS WITH AUDIO/VISUAL SIGNALS PERTAINING TO REMOTE EVENTS" assigned Ser. No. 10/680,612 and filed on Oct. 7, 2003, which is hereby incorporated by reference in its entirety.

BACKGROUND OF THE INVENTION

This invention relates generally to video and audio signal processing techniques and, more particularly, to methods and systems for receiving video and audio signals from a plurality of sources and for providing a user with combinations of these signals from which to select.

Spectators attending a stadium for viewing an event, such as a sporting event, for example, are often interested in events simultaneously occurring at other locations, such as, other stadiums. As an example, a spectator attending a football game at a stadium may be interested in other football games at other stadiums, particularly at other stadiums within the same general region, for example, hearing commentary or viewing images of other games.

Radio stations may broadcast AM and/or FM audio signals of stadium events. Such audio signals normally define the comments of one or more commentators who watch a stadium event and comment on the event as it is occurring such that listeners of the audio broadcast may receive real-time information pertaining to the stadium event. For sporting events, the commentary provided by such commentators is often referred to as a "play-by-play" commentary.

Moreover, a spectator at one stadium may utilize a radio to receive at least one audio event signal from a radio station, which may be any audio signal that provides information (e.g., real-time and/or prerecorded information) pertaining to the event. The radio broadcast allows a spectator to hear information pertaining to an event occurring at another stadium. Unfortunately, an audio event signal pertaining to a stadium event of interest to a spectator is not always broadcast by a radio station using AM or FM signals, thereby preventing spectators outside the stadium from receiving the broadcast. Further, in situations where an audio event signal of interest to a spectator is broadcast in such a manner that it may be received, the spectator may be attending a stadium event out of range of the audio event signal of interest. Thus, a spectator at one stadium is not always able to receive an audio event signal providing detailed audio information about an event occurring at another stadium. A spectator likewise may be unable to receive a video event signal providing detailed video information about an event occurring at another stadium.

Further, spectators may be interested in viewing or accessing other content while at an event. For example, a spectator may want to check the news during half-time of a game. However, known systems do not allow spectators to selectively access different content from different sources while at an event.

BRIEF DESCRIPTION OF THE INVENTION

In one exemplary embodiment, a system for providing content for access by a portable device at an event includes an interface to receive signals from a plurality of sources. The plurality of sources are located at an event and remote from the event. The signals define event content and non-event content. The system further includes a processor for processing the received signals to generate combined signals based upon the received signals from the plurality of sources. The system also includes a transmitter for transmitting to a plurality of portable devices at the event the combined signals. The combined signals are configured to allow a user to select content using the portable device receiving the combined signals.

In another exemplary embodiment, a method for providing content for access by a portable device at an event includes receiving at an event a plurality of signals from a plurality of sources. The plurality of signals define event content and non-event content. The method further includes determining received signals to combine to define at least one combined signal. The method also includes broadcasting the at least one combined signal at the event, with the at least one combined signal configured to be received by at least one portable device.

In yet another exemplary embodiment, a method for providing content for access by a user at an event includes receiving via a portable device event content and non-event content defined by at least one signal combined from a plurality of signals from a plurality of sources. The method further includes outputting at least one of video and audio content based upon at the at least one signal.

DETAILED DESCRIPTION OF THE INVENTION

Figure 1:
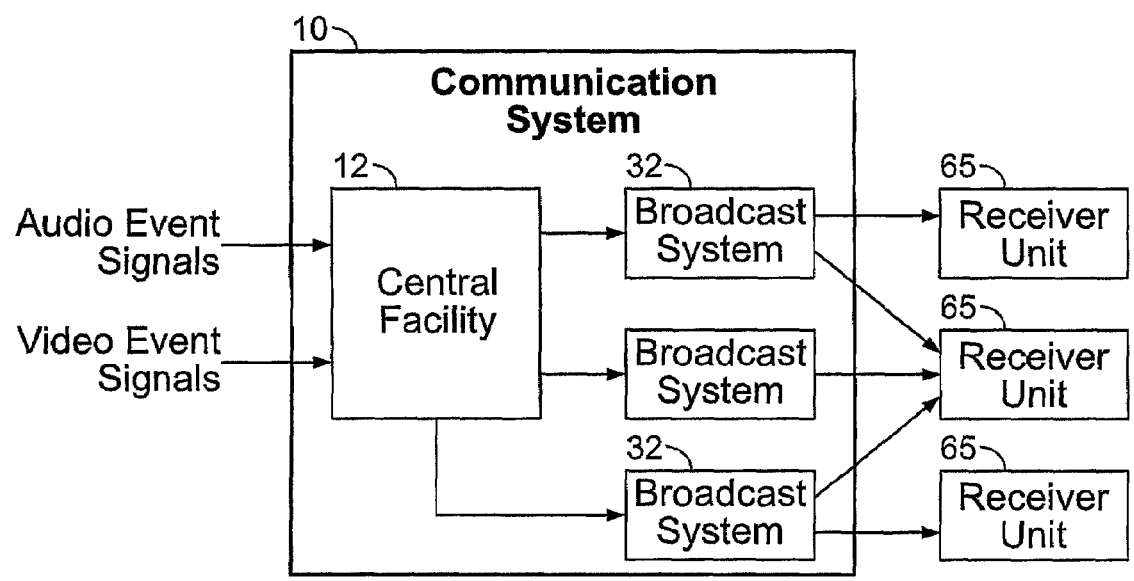
FIG. 1 is a block diagram of a communication system in accordance with one exemplary embodiment of the present invention.

Exemplary embodiments of methods and systems providing spectators at an event with a plurality of audio and video event signals pertaining to other remote events and other content, and from which a spectator may select one or more of the audio and video event signals are described below in detail. A technical effect of the methods and systems described herein include at least one of generating a plurality of different audio and/or video signals at one or more remote locations (e.g., generating multiple audio signal events at different stadiums, with the audio signal events defining information, such as play-by-play commentary pertaining to events at the different stadiums), transmitting the plurality of audio and/or video signals to a central facility, wherein the audio and/or video signals are selectively transmitted to broadcast systems that each service one or more events (e.g., one or more stadiums), and allowing spectators to select from the audio and/or video signals transmitted via the broadcast systems.

It should be noted that when reference is made herein to audio and/or video event signals, this refers to any audio or video signal generated and/or transmitted to and/or from an event, such as, for example, audio and video signals that provide information, including, but not limited to, real-time and/or prerecorded information, pertaining to an event or other content from different sources. It should also be noted that when reference is made herein to non-event or non-event related audio and/or video signals, this refers to any live, delayed, or archived and recorded audio and/or video signals such as for example, live audio and/or video signals being generated from another event, rebroadcast audio and/or video signals from an another event, any other live or recorded audio/video content, such as, for example, content relating to sporting events, entertainment events (e.g. movies, cartoons, advertisements, statistics and data) and or other third party content (e.g., news).

In the exemplary embodiments, the methods generally provide spectators at an event with a selection of audio and/or video event signals pertaining to other remote events that may be of interest to the spectators. In particular, a plurality of different audio and/or video event signals are generated at various locations (e.g., remote locations). For example, multiple audio event signals may be generated at different stadiums, and each audio event signal may define information, such as a play-by-play commentary pertaining to the event occurring at the stadium from which the audio event signal is generated or from another stadium.

Each of the audio and/or video event signals may be transmitted to a central facility, and various communication techniques may be employed to communicate the audio and/or video event signals to the central facility. In an exemplary embodiment, audio and/or video event signals are communicated to a central facility via a communication network (e.g., an existing or specifically designed network), such as the publicly switched telephone network (PSTN). In order to increase performance, the audio and/or video event signals may be transmitted over a high speed communication link, such as, for example, a T1 communication line. It should be noted that the communication links utilized to transmit the audio and/or video event signals to the central facility are not limited to specific types of links or physical land lines, but may include, for example, terrestrial links and/or satellite links.

At the central facility, the audio and/or video event signals may be selectively coalesced and transmitted to a plurality of broadcast systems that each service one or more events and/or stadiums. For example, a determination may be made that spectators at a particular stadium are likely to be interested in particular ones of the audio event signals. In an exemplary embodiment, such audio event signals are then transmitted to the broadcast system servicing the particular stadium. The broadcast system then may broadcast the audio event signal to the spectators being serviced by the broadcast system. For example, a determination may be made that spectators at a first stadium for viewing a Southeastern Conference (SEC) football game are interested in other SEC football games occurring at other stadiums. In such an case, audio event signals defining the play-by-play commentary of the other SEC football games may be transmitted, by the central facility, to the broadcast system servicing the first stadium. The broadcast system may then broadcast these audio event signals to the spectators at the first stadium.

For other stadiums, different sets of audio event signals may be provided. For example, for a stadium where a BIG 10 football game is occurring, the central facility may transmit to the broadcast system servicing that stadium, audio event signals pertaining to other BIG 10 football games. These audio event signals may then be broadcast to the spectators of the stadium via the broadcast system. Further, and as another example, for a stadium where a Major League Baseball (MLB) game is occurring, audio event signals pertaining to other MLB baseball games may be transmitted to the broadcast system servicing the stadium. Various combinations of audio event signals thereby may be provided to spectators at various stadiums and are not limited to the combinations described herein. It should be noted that video event signals likewise may be communicated as described herein.

Transmission of a set of audio and/or video event signals to a particular broadcast system may occur via various transmission methodologies. In an exemplary embodiment, the audio and/or video event signals are communicated to the broadcast systems via a communication network (e.g., an existing or specifically designed network), such as, for example, the PSTN. To provide increased performance, the audio and/or video event signals may be transmitted over high speed communication links such as, for example, a T1 communication line. It should be noted that the communication links utilized to transmit the audio and/or video event signals to the broadcast systems are not limited to specific types of links or physical land lines, but may include, for example, terrestrial links and/or satellite links. Furthermore, audio and/or video event signals may be generated as or may be converted into digital signals in order to enable better and/or faster transmission to and/or from a broadcast system.

In an exemplary embodiment, when a broadcast system receives audio and/or video event signals from the central facility, the broadcast system may communicate such signals to spectators at the stadium serviced by the broadcast system. The communication of such signals may be wireless and/or non-wireless. For example, the broadcast system may modulate each of the audio and/or video event signals on a carrier signal of a different frequency and wirelessly transmit the modulated signals to the stadium spectators. The stadium spectators may be provided with portable receiver units that demodulate and filter the audio and/or video event signals transmitted by the broadcast system. Specifically, using a receiver unit, a spectator may select one or more of the audio and/or video event signals received by the receiver unit, and the receiver unit may filter out all of the other audio and/or video event signals, thereby recovering the selected audio and/or video event signal or signals. The recovered audio and/or video event signal or signals may then be converted into sound via one or more speakers of the receiver unit or images via a display of the receiver unit.

It should be noted that a broadcast system and, in particular, an antenna of the broadcast system may be located at or close to the stadium serviced by it. In such an embodiment, the audio and/or video event signals transmitted by the broadcast system can be transmitted over a short distance (e.g., less than approximately one-half of a mile), thereby limiting various restrictions imposed by regulation agencies, such as the Federal Communication Commission (FCC). Various frequency ranges may be employed, for example, each broadcast system in an exemplary embodiment may transmit audio and/or video event signals within the ultra-high frequency (UHF) range, microwave range (e.g., two to ten gigahertz range), etc.

Figure 2:
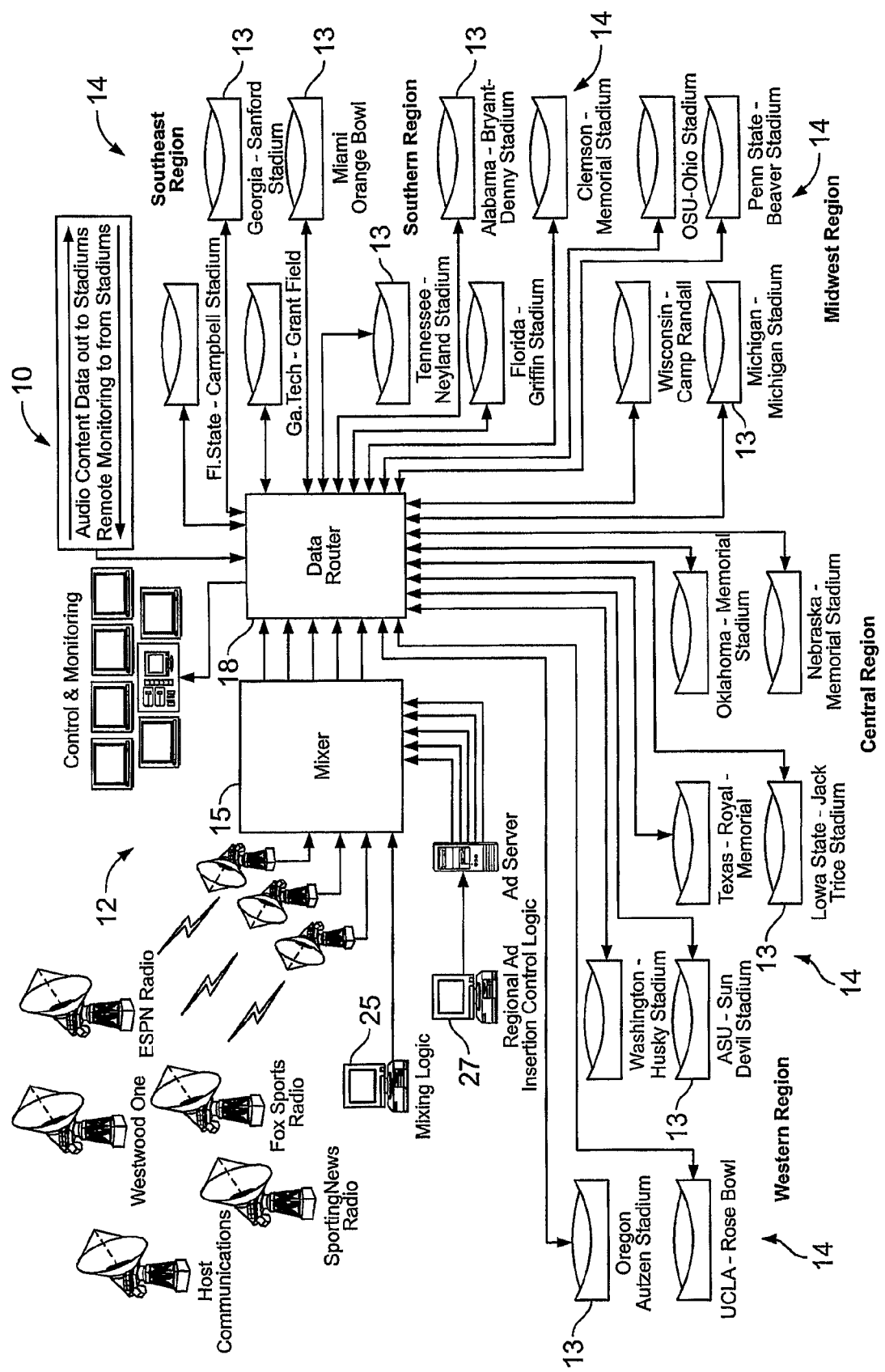
FIG. 2 is a block diagram of a central facility system in accordance with one exemplary embodiment of the present invention.
Figure 3:
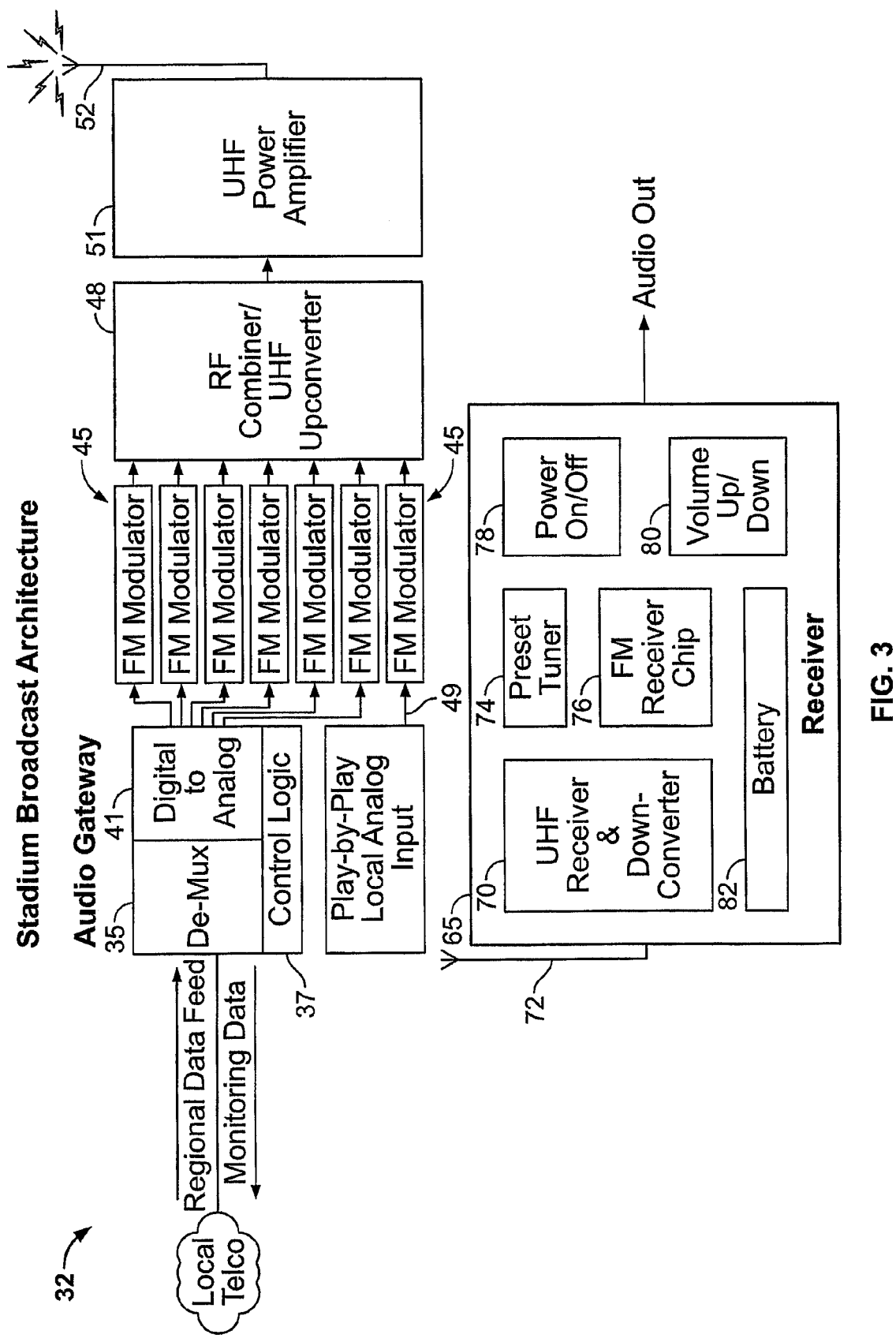
FIG. 3 is a block diagram of a broadcast system in accordance with one exemplary embodiment of the present invention.

FIGS. 1 through 3 illustrate exemplary embodiments of a communication system 10 that will be described in more detail below. For illustrative purposes, the communication system 10 will be described as enabling spectators attending NCAA football games at stadiums to select and hear a play-by-play commentary and/or see video images of various football games. However, it should be noted that, in other embodiments, the communication system 10 may enable spectators to listen to and view other types of information pertaining to other types of events (e.g., football, auto racing, golf, horse racing, etc.) located at different venues (e.g., race track, open road race course, golf course, etc.) or other types of information (e.g., advertisements).

FIG. 1 is a block diagram of a communication system 10 of an exemplary embodiment of the present invention. The communication system includes a central facility 12 for receiving audio and/or video signals (e.g., audio and/or video feeds and audio and/or video event signals) from a plurality of sources (e.g., local event and remote sources). The central facility 12 combines various audio and/or video signals as described herein for transmission to one or more broadcast systems 32. The broadcast systems 32 will be described in more detail with reference to FIGS. 5 and 6. In an exemplary embodiment, a separate broadcast system is provided in connection with or corresponding to each of a plurality of events or, for example, a plurality of stadiums. The broadcast systems 32 transmit a plurality of audio and/or video signals to receiver units 65, which allow users attending events, for example, at various stadiums to select audio and or video signals from one or more sources. The audio and video signals define content for audio output or display with the receiver units 65. The sources may be located at the event at which the spectator is attending and providing audio and video signals pertaining to that event, or may be located remote from the event attended by the spectator, and provide audio and video signals pertaining to the remote event. Further, the sources may provide audio and video signals pertaining to other content, such as, for example, advertising.

As shown in FIG. 2, audio and/or video signals, for example, play-by-play feeds defining play-by-play commentaries of various football games are transmitted to the central facility 12. These play-by-play feeds may be transmitted via satellite, T1, and/or other types of communication links. Further, the play-by-play feeds may be transmitted as digital or analog signals. In an exemplary embodiment, the play-by-play feeds are generated as digital signals or converted into digital signals before being transmitted to the central facility 12.

The central facility 12, in an exemplary embodiment, includes a feed mixer 15 and a data router 18. The feed mixer 15 combines the audio and/or video feeds and transmits the audio and/or video feeds to the data router 18. The feed mixer 15 combines the play-by-play feeds such that, for example, play-by-play feeds that are likely to be of interest to a group of spectators or users are combined together. For example, the play-by-play feeds may be mixed such that play-by-play feeds associated with games or teams within or from the same region are combined (e.g., multiplexed) together.

For example, stadiums 13 participating in (e.g., serviced by) the communication system 10 may be categorized based on their regional location. As shown in FIG. 2, the stadiums 13 may be categorized into a plurality of regions 14, such as first through fifth regions (e.g., a Southeast Region, a Southern Region, a Midwest Region, a Central Region, and a Western Region). Each play-by-play feed from the same region may be combined by the feed mixer 15. Therefore, the feed mixer 15 may output combined signals in which each combined signal comprises play-by-play feeds from the same region. For example, one of the combined signals may comprise play-by-play feeds from each stadium within the Southern Region that is hosting a football game. Such a combined signal may comprise play-by-play feeds from Neyland Stadium, Bryant-Denny Stadium, Griffin Stadium, and Memorial Stadium (Clemson).

The mixing of play-by-play feeds as described herein may be controlled by mixing logic 25. In one exemplary embodiment, the mixing logic 25 (e.g., user interface such as a computer) receives inputs from a user and mixes the play-by-play feeds based on these inputs, thereby allowing a user to control which feeds are mixed together. In another exemplary embodiment, user preferences (e.g., viewing preferences) or predetermined criteria (e.g., closest games) are used control which feeds are mixed together. Further, an other content insertion control logic 27 may be configured to insert, for example, advertisements and/or commercials into the feeds mixed by the feed mixer 15. It should be noted that the mixing logic 25 and the other content insertion control logic 27 may each be implemented in hardware, software, or any combination thereof.

The data router 18 may be configured to transmit each of the combined signals to, for example, corresponding events or ones of the stadiums. For example, a combined signal including feeds likely to be of interest to spectators at Neyland Stadium may be transmitted to Neyland stadium. Because spectators attending a sporting event at a stadium are likely to be interested in similar sporting events occurring within the same approximate region, a combined signal having one or more play-by-play feeds from a particular region may be transmitted to the stadiums within the same region. For example, a combined signal including play-by-play feeds from football games within the Southern Region may be transmitted to one or more stadiums within this same region. As a result, the play-by-play feeds defining the combined signal received by a particular stadium are likely to be of interest to the spectators at the particular stadium. In the exemplary embodiment shown in FIG. 2, the combined signals are communicated to the stadiums over a telecommunication network using high speed communication links, such as T1 connections. However, other types of communication techniques may be employed in other embodiments. Further, it should be noted that various other methodologies for determining which stadiums are to receive which feeds may be employed in other exemplary embodiments as desired or needed and as described herein.

Referring now to FIG. 3, and for example, for each event or stadium, an exemplary embodiment of a broadcast system 32 receives the combined signal transmitted to it by the central facility 12 (shown in FIG. 2). A demultiplexer 35, controlled by control logic 37, demultiplexes the combined signal to thereby recover, for example, each play-by-play feed within the combined signal. A digital-to-analog (D/A) converter 41 converts each recovered play-by-play feed into analog form and provides each of the analog feeds to a modulator 45. Each modulator 45 modulates its received play-by-play feed onto a carrier signal of a different frequency, and a signal combiner 48 combines the modulated signals, which are then amplified by a power amplifier 51, before being wirelessly transmitted by an antenna 52. It should be noted that if the combined signal received by the broadcast system 32 of a particular stadium or associated with a particular event does not include, for example, a feed pertaining to the event occurring at the same stadium, a local play-by-play feed 49 generated at the stadium may be included in the feeds modulated by the modulators 45.

In one exemplary embodiment, one or more spectators, for example, at the stadium, is provided with a receiver unit 65 capable of receiving and demodulating the signals transmitted by the broadcast system 32. The selected audio and/or video signals, such as play-by-play feeds are then output by the receiver unit 65 (e.g., output as audio from a speaker or video from a display), thereby reproducing, for example, the play-by-play commentary or video images defined by the selected feed(s). For example, assume that a spectator at Neyland Stadium, while watching a Tennessee game occurring at Neyland Stadium, is interested in the football game occurring at Griffin Stadium. In such an example, the spectator may tune his receiver unit 65 (e.g., select a channel) such that the receiver unit 65 filters out all play-by-play feeds except the feed originally generated at Griffin stadium. As a result, the receiver unit 65 outputs the play-by-play commentary of the football game occurring at Griffin Stadium. Moreover, the spectator may listen to this commentary while watching the Tennessee football game or another game on the receiver unit 65.

In an exemplary embodiment, the receiver unit 65 is portable and allows the user to provide inputs for selecting at least one or more of the audio and/or video signals, such as, for example, play-by-play feeds and/or video signals of interest to the user. In another exemplary embodiment as shown in FIG. 3, a receiver unit 65 includes a receiver and converter component 70 that receives and converts each audio and/or video signal received from broadcast system 32 via antenna 52 and antenna 72. The receiver unit 65 also includes a tuner 74 for tuning the audio and/or video feed provided on different frequencies such that feeds on different frequencies can be output from the receiver unit 65.

Additional components for processing the different types of feeds (e.g., audio and video signals) may be provided, such as, for example, an FM receiver component 76 for receiving and processing frequency-modulated signals. The receiver unit 65 also may include user controls for controlling operation of the receiver unit 65 including a selector (not shown) for selecting between different feeds and sources, a display (not shown) for displaying event images from received video signals, a power on/off component 78 (e.g., switch) for powering on and off the receiver unit 65, and a volume up/down component 80 for controlling the volume output of the receiver unit 65. The receiver unit 65 also includes a power supply 82 (e.g., removable battery, rechargeable battery, etc.) for powering the receiver unit 65. It should be noted that although the receiver unit 65 has been described with particular component parts, it is not so limited, and additional or different component parts may be provided as desired or required (e.g., storage component for storing audio and/or video feeds).

It also should be noted that it is not necessary for the broadcast system 32 used to transmit signals, for example, to spectators at a particular stadium, to be located at or close to the particular stadium. However, locating the broadcast system 32 at or close to the stadium may be desired or needed (e.g., results in less strenuous FCC restrictions). Additionally, it is not necessary for the central facility 12 to selectively determine which of the audio and/or video signals (e.g., play-by-play feeds) are to be provided, for example, to the different stadiums. For example, the central facility 12 may be configured to provide each audio and/or vide signal to each of the stadiums regardless of each stadium's regional location. Further, it should be noted that video event signals in addition to or instead of audio event signals may be processed by the communication system 10 described above. For example, in addition to or instead of generating and providing a play-by-play audio signal of an event, a camera may generate a play-by-play video signal of the event. This video signal then may be transmitted to the central facility 12, which mixes the video signal with, for example, other audio and/or video signals from other events. After being transmitted to a broadcast system 32, the broadcast system 32 may modulate and transmit the video signal to, for example, spectators at the stadium, similar to the manner in which the audio signals are modulated and transmitted to spectators at a stadium, as described above. The receiver unit 65 may include a video display for displaying the video signal when such signal is selected by the spectator's input. An exemplary system for distributing the audio and/or video signals is described in U.S. Pat. No. 6,578, 203, the entire disclosure of which is hereby incorporated by reference herein. For example, the system described therein may be employed to provide to spectators at a stadium the audio and/or video signals received from the central facility 12.

Moreover, the spectator may view a play-by-play video signal from an event at a remote stadium and may simultaneously listen to a play-by-play audio signal from the same event. Alternatively, the spectator may view a play-by-play video signal from an event at a remote stadium and may simultaneously listen to a play-by-play audio signal from another event at another remote stadium or from the stadium at which the spectator is present. Furthermore, it is not necessary for all of the signals processed by the communication system 10 to pertain to an event occurring at a stadium. For example, a spectator may view a play-by-play video signal pertaining to an event at a remote stadium while listening to an audio signal defining music unrelated to any of the events at any of the stadiums or a video signal defining programming unrelated to any of the events at any of the stadiums (e.g., advertisement or commercial).

Figure 4:
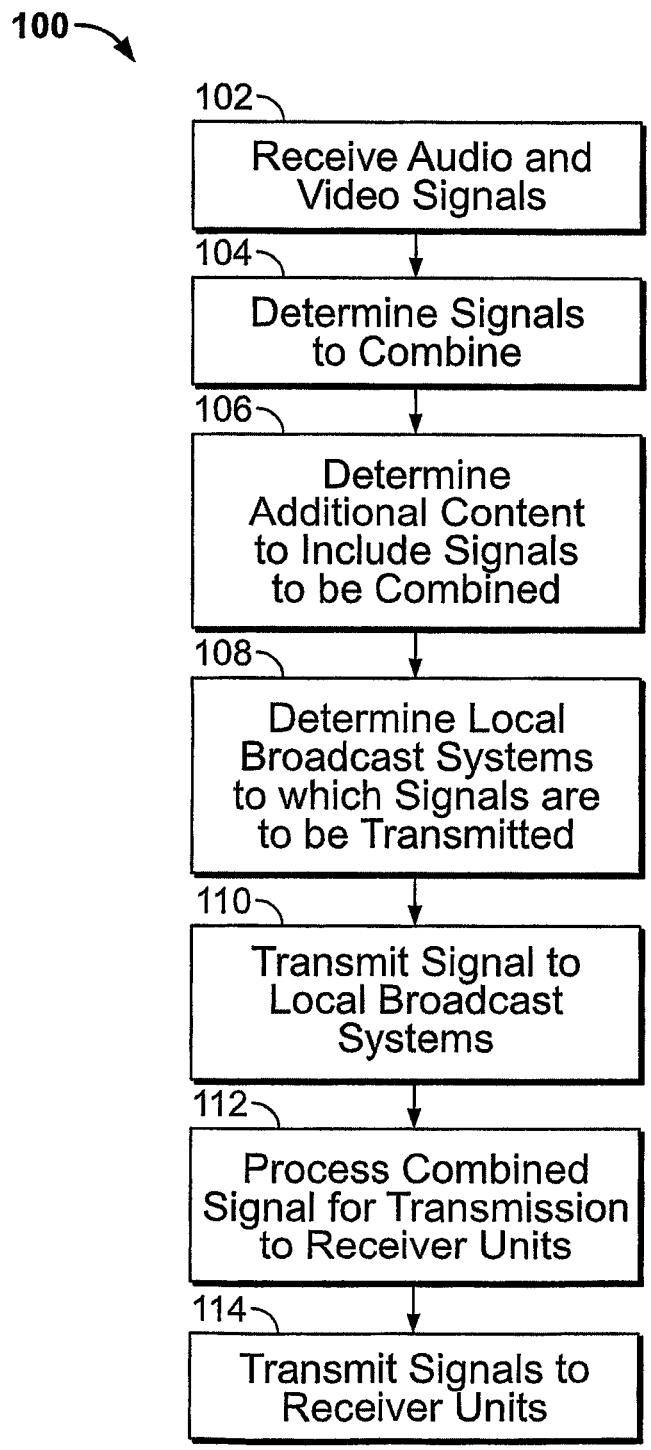
FIG. 4 is a flowchart of exemplary processes utilized by various embodiments of a communication system of the present invention.

FIG. 4 is a flowchart 100 illustrating exemplary processes utilized by the communication system 10. The technical effect of the communication system 10 is achieved by first receiving a plurality of audio and video signals from one or more sources (e.g., audio and video signals from a plurality of stadiums) at 102. A determination is then made at 104 as to which audio and video signals to combine. This may include, for example, categorizing the audio and video signals based upon the geographic location of the source of the signals (e.g., signals from stadiums within a particular geographic region or relating to teams in that region) and/or combining the signals based upon predetermined criteria (e.g., combine signals based upon user preferences). It should be noted that the audio and video signals may be combined based upon other criteria, determinations or factors, such as, for example, time of day (e.g., events occurring at the same time), the type of event (e.g., all sports events, all football games, all baseball games, etc.) and/or variety (e.g., combine signals to provide diverse programming). A determination is also made at 106 as to other content to be included as part of the signals to be combined (e.g., advertisements or commercials).

A determination is then made at 108 as to which broadcast systems 32 (shown in FIG. 1) the signals to be combined are to be transmitted. This also may include a determination of the type of communication link to use to transmit the combined signals. Based upon the determinations at 104, 106, 108 and any other user inputs (e.g., used specified content), combined signals are transmitted to the determined broadcast systems 32 at 110.

The combined signals are received by the broadcast systems 32 and processed (e.g., demultiplexed and modulated in analog form) at 112, for transmission (e.g., local transmission) to a one or more receiver units 65 (shown in FIG. 3), for example, within and in close proximity to a stadium. This processing may also include modulating the signals onto different frequencies. The processed signals are then broadcast at 114 to the receiver units 65 within the broadcasting range of the broadcast systems 32. For example, the signals may be broadcast to receiver units 65 within a stadium or within one hundred feet of the stadium. A user having a receiver unit 65 may then select the specific signals, for example, defining different feeds to output from the receiver unit 65.

In operation, a user with a receiver unit 65 at an event (e.g., football game) may select from different audio and video feeds that are broadcast at the event. For example, a user may select audio and/or video signals defining content from another event (e.g., another football game), video feeds of different angles or portions of the event being attended and/or other content such advertising and/or commercials. The audio and/or video content may be accessed real-time or stored for later hearing and/or viewing (e.g., to review a football play or listen to specific commentary). The selectable audio and video signals may be provided, for example, on predetermined channels selectable by a user. Further, the sources of these audio and video signals may be located at the event, remote from the event, or accessed from stored or archived audio and video signals. Additionally, the communication system 10 may be configured such that the receiver unit 65 may receive audio and video signals at locations other than at an event (e.g., at a stadium event), such as, for example, at a home in connection with satellite television broadcasting. Further, conditional access may be provided such that, for example, only authorized receiver units 65 (e.g., receiver units 65 having authorized serial numbers) can receive the audio and video signals (e.g., encrypted audio and video signals).

It should be noted that various embodiments of the present invention also allow users with, for example, portable devices, and more particularly, wireless portable devices to receive video and audio content from a plurality of sources and to select at the portable wireless device the content that the user desires or needs to access. For example, a user may select from programming from different sources provided on a plurality of selectable channels. Using the various embodiments of the present invention, a transmission or broadcast system may provide a plurality of combined audio/video signals at an event for access by a user with a wireless portable device.

Thus, spectators at an event may be provided with a selection of audio and/or video event signals pertaining to other remote events and other non-event related content that may be of interest to the spectators. In particular, a plurality of different audio and/or video event signals are received from various locations and sources (e.g., remote locations, cable TV channels, Satellite TV channels, Satellite or Digital radio, VCR or DVD players). These different signals may be provided, for example, by the communication system 10 via one or more broadcast systems 32. For example, multiple audio event signals may be received from different events being provided via a Satellite Radio, and each audio event signal may define information, such as a play-by-play commentary pertaining to the event occurring at the stadium from which the audio event signal is generated or from another stadium.

Each of the audio and/or video event signals and each of the non-event remote signals may be received, monitored and then selected for broadcast by the broadcast system 32 at an event based on the relevance of the content, or by the particular desires and preferences of the event spectators that will be using portable receiving devices. For example, a determination may be made that spectators at a particular stadium are likely to be interested in particular ones of the audio event signals. In an exemplary embodiment, such audio event signals are then transmitted to the broadcast system 32 servicing the particular stadium. The broadcast system 32 then may broadcast the audio event signal to the spectators being serviced by the broadcast system 32. For example, a determination may be made that spectators at a first stadium for viewing a Southeastern Conference (SEC) football game are interested in other SEC football games occurring at other stadiums. In such a case, audio event signals defining the play-by-play commentary of the other SEC football games may be transmitted to the broadcast system 32 servicing the first stadium. The broadcast system 32 may then broadcast these audio event signals to the spectators at the first stadium.

For other stadiums, different sets of audio event signals may be received, monitored and selected for broadcast at the event. For example, for a stadium where a BIG 10 football game is occurring, a Satellite Radio system could be monitored for audio event signals pertaining to other BIG 10 football games. These audio event signals may then be selected for broadcast to the spectators of the stadium via the broadcast system 32. Further, and as another example, for a stadium where a Major League Baseball (MLB) game is occurring, audio and/or video event signals pertaining to other MLB baseball games being provided by a Cable TV system may be monitored and selected for broadcast by the broadcast system 32 servicing the stadium. Various combinations of audio and/or video event signals thereby may be provided to spectators at various stadiums and are not limited to the combinations described herein.

In addition to providing a user with live, non-event audio and/or video content from another sporting or entertainment event, other non-event related content can be monitored via a plurality of broadcast sources that are connected to the broadcast system 32 at the event. These other broadcast sources (e.g. Cable TV, Satellite TV, Satellite or Digital Radio, Local Broadcast TV or Radio) can be monitored for relevant non-event related content (e.g. news, weather, sports tickers and scores, movies, cartoons, advertisements, statistics and data) that can then be selected for broadcast at a specific event by the broadcast system 32 located at, for example, a stadium.

In an exemplary embodiment, when the broadcast system 32 receives audio and/or video event signals from various input sources, the broadcast system 32 may communicate such signals to spectators at the stadium serviced by the broadcast system. The communication of such signals may be wireless and/or non-wireless. For example, the broadcast system 32 may modulate each of the audio and/or video event signals on a carrier signal of a different frequency and wirelessly transmit the modulated signals to the stadium spectators. The stadium spectators may be provided with portable receiver units that demodulate and filter the audio and/or video event signals transmitted by the broadcast system 32. Specifically, using a receiver unit, a spectator may select one or more of the audio and/or video event signals received by the receiver unit, and the receiver unit may filter out all of the other audio and/or video event signals, thereby recovering the selected audio and/or video event signal or signals. The recovered audio and/or video event signal or signals may then be converted into sound via one or more speakers of the receiver unit or images via a display of the receiver unit.

It should be noted that a broadcast system 32 and, in particular, an antenna of the broadcast system may be located at or close to the stadium serviced by it. In such an embodiment, the audio and/or video event signals transmitted by the broadcast system 32 can be transmitted over a short distance (e.g., less than approximately one-half of a mile), thereby limiting various restrictions imposed by regulation agencies, such as the Federal Communication Commission (FCC). Various frequency ranges may be employed, for example, each broadcast system 32 in an exemplary embodiment may transmit audio and/or video event signals within the ultra-high frequency (UHF) range, microwave range (e.g., two to ten gigahertz range), etc.

Figure 5:
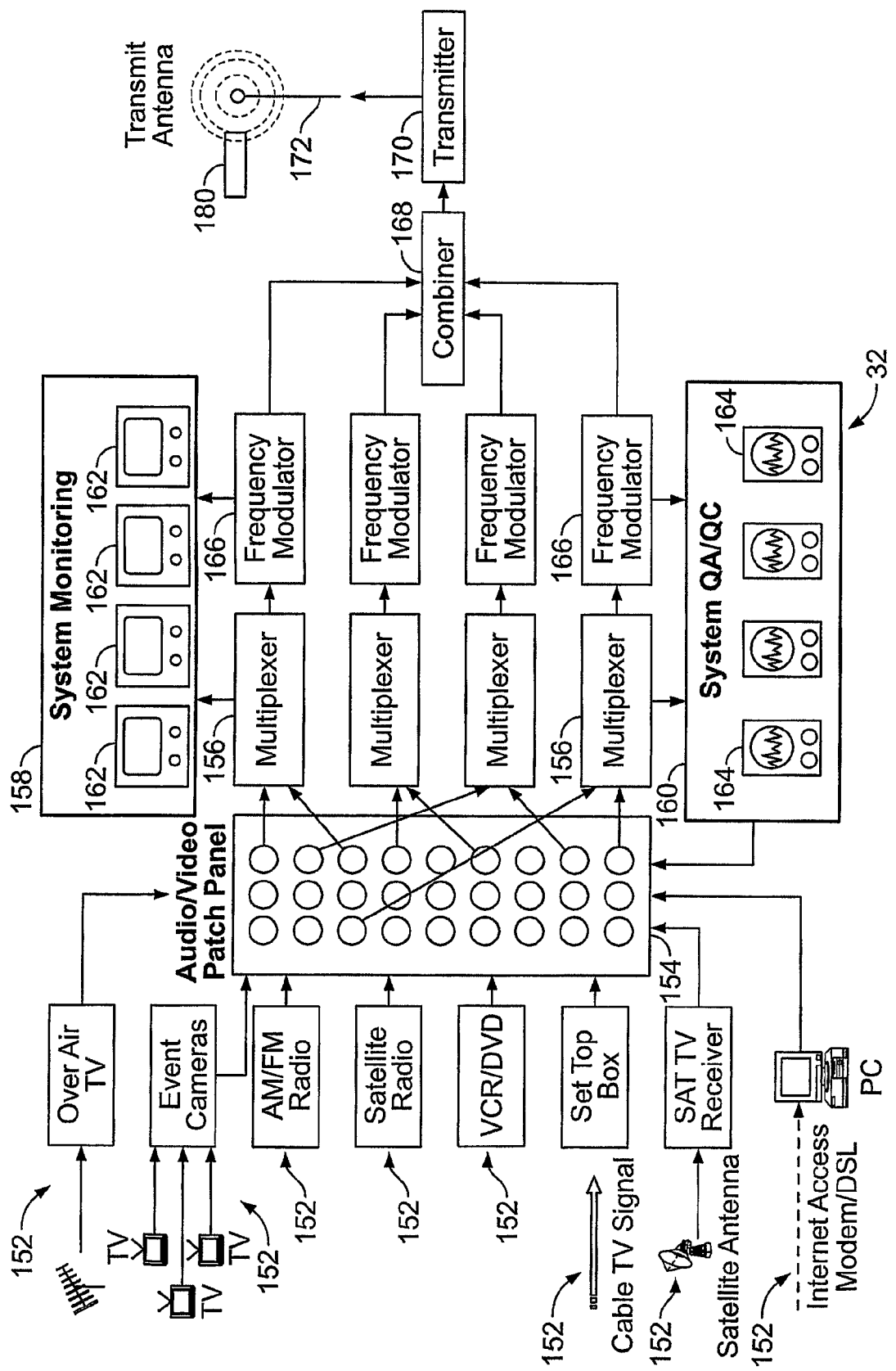
FIG. 5 is a block diagram of a local broadcast system in accordance with one exemplary embodiment of the present invention.

FIG. 5 illustrates an exemplary embodiment showing the various input sources for both event and non-event audio and/or video signals that are monitored and selected for broadcast by the broadcast system located at the event, also referred to herein as a local broadcast system. For illustrative purposes, the broadcast system will be described as enabling spectators attending NCAA football games at stadiums to select and hear a play-by-play commentary and/or see video images of various football games, as well as access other non-event content. However, it should be noted that, in other embodiments, the broadcast system may enable spectators to listen to and view other types of information pertaining to other types of events (e.g., football, auto racing, golf, horse racing, etc.) located at different venues (e.g., race track, open road race course, golf course, etc.) or other types of information (e.g., news or stock quotes).

FIG. 5 is a block diagram of a local broadcast system 32 of an exemplary embodiment of the present invention. The broadcast system 32 generally includes means for receiving audio and/or video signals (e.g., audio and/or video feeds and audio and/or video event signals, non-event content, recorded or archived content) from a plurality of sources 152 (e.g., local event and remote sources). The broadcast system 32 then may combine various audio and/or video signals as described herein for broadcast of a plurality of audio and/or video signals to receiver units 180 or receiver units 65 (shown in FIG. 3), which allow users attending events, for example, at various stadiums to select audio and or video signals from one or more sources. The audio and video signals define content for audio output or display with the receiver units. The sources may be located at the event at which the spectator is attending and providing audio and video signals pertaining to that event, or may be located remote from the event attended by the spectator, and provide audio and video signals pertaining to the remote event. Further, the sources may provide audio and video signals pertaining to other content, such as, for example, non-event content such as television programming.

In one exemplary embodiment, one or more spectators, for example, at the stadium, is provided with the receiver unit 180 capable of receiving and demodulating the signals transmitted by the broadcast system 32. The selected audio and/or video signals, such as play-by-play feeds, advertising, television programming, etc. are then output by the receiver unit 180 (e.g., output as audio from a speaker or video from a display), thereby reproducing, for example, the play-by-play commentary or video images defined by the selected feed(s). For example, assume that a spectator at Neyland Stadium, while watching a Tennessee game occurring at Neyland Stadium, is interested in the football game occurring at Griffin Stadium. In such an example, the spectator may tune his receiver unit 180 (e.g., select a channel) such that the receiver unit filters out all play-by-play feeds except the feed originally generated at Griffin stadium. As a result, the receiver unit outputs the play-by-play commentary of the football game occurring at Griffin Stadium. Moreover, the spectator may listen to this commentary while watching the Tennessee football game or another game on the receiver unit 180. As another example, the spectator may tune the receiver unit 180 to receive a television feed or to access Internet content.

It also should be noted that it is not necessary for the system used to transmit signals, for example, to spectators at a particular stadium, to be located at or close to the particular stadium. However, locating the broadcast system at or close to the stadium may be desired or needed (e.g., results in less strenuous FCC restrictions). Further, it should be noted that any type of video and/or audio event and/or non-event signals may be processed by the broadcast system 32. For example, in addition to or instead of generating and providing a play-by-play audio signal of an event, a camera may generate a play-by-play video signal of the event or a satellite system may generate satellite television programming. This video content then may be routed to the broadcast system 32 at the event, which mixes the video signal with, for example, other audio and/or video signals from other events or non-event content or signal.

Specifically, the broadcast system 32 receives content in the form of audio and video signals from a plurality of sources 152. In one exemplary embodiment, the system may be a mobile broadcast system (e.g., within a broadcast van) that includes an interface 154, shown as an audio/video patch panel for receiving signals from each of the various sources. It should be noted that broadcast system 32 may be a fixed system or partially fixed (e.g., some of the components fixed at a stadium and other components within a mobile unit). A plurality of multiplexers 156 receive the signals from the interface 154. The multiplexers 156 combine the signals as described in more detail herein. Each of the multiplexers 156 outputs the combined signals to a monitoring system 158 and a quality control system 160. The monitoring system 158 may include a plurality of displays 162 (e.g., monitors with a broadcast van) for viewing, for example, by a program controller operating the broadcast system 32 for monitoring the content. The quality control system 160 may include a plurality of signal analyzers 164 or other components for measuring signal quality and maintaining a level of quality assurance/quality control (QA/QC). For example, one or more oscilloscopes, spectrum analyzers and/or video monitors may be provided for use onsite to ensure that the quality and strength of each multiplexed signal is within or satisfies a predetermined or predefined specification or level prior to be being combined and transmitted.

The outputs of the multiplexers 156, and in particular the multiplexed signals are provided to a plurality of frequency modulators 166 for modulating the plurality of multiplexed signals on different frequencies. The modulated signals are then provided to a combiner 168 for combining the signals and transmission via a transmitter 170 using, for example, an antenna 172. In various embodiments, the multiplexers 156, frequency modulators 166 and combiner 168 together may define, or be embodied in, one or more processors.

Thus, the broadcast system 32, after receiving a plurality of signals from a plurality of sources, modulates and transmits selected signals to, for example, spectators at the stadium having receiver units 180.

Figure 6:
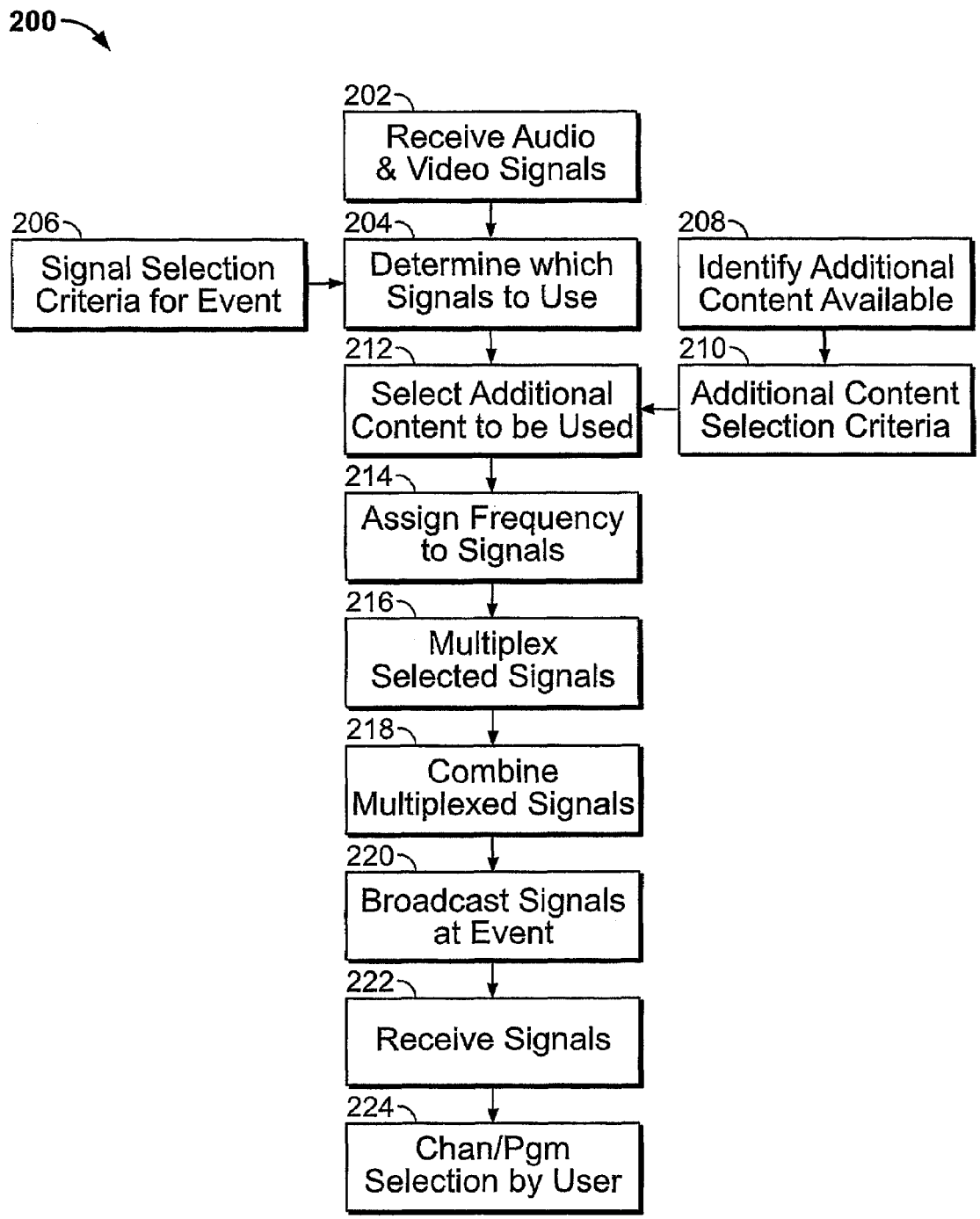
FIG. 6 is a flowchart of an exemplary process for accessing and broadcasting content from a plurality of sources at an event in accordance with an exemplary embodiment of the present invention.

FIG. 6 is a flowchart 200 illustrating exemplary processes utilized by the broadcast system 32. A plurality of audio and video signals are received from a plurality of sources at 202.

This includes receiving audio and video signals defining content from, for example, both local and remote sources, such as Cable TV, Satellite TV, Satellite or Digital Radio, Over the Air TV or Radio, VCR or DVD Players, and generally defining event content and non-event content. A determination is then made at 204 as to which audio and video signals to use (i.e., event related content). This may include using signal selection criteria for an event at 206 to make a determination of which signals to use. This criteria may include, for example, spectator or regional preferences, information relating to the geographic location of the source of the signals (e.g., signals from stadiums within a particular geographic region or relating to teams in that region) and/or other predetermined criteria (e.g., type of game being played). It should be noted that the audio and video signals may be selected based upon other criteria, determinations or factors, such as, for example, time of day (e.g., events occurring at the same time), the type of event (e.g., all sports events, all football games, all baseball games, etc.) and/or variety (e.g., select signals to provide diverse programming). At 208 additional content (i.e., non-event related content) available for use is identified and at 210 selection criteria for determining which additional content to include is used to determine additional content to be included as part of the signals to be broadcast (e.g., news from an over the air source) at 212.

At 214 a transmission frequency is assigned to each of the signals and at 216 the signals are multiplexed. The multiplexed signals are combined at 218 and the combined signals are broadcast at the event at 220. The combined signals are received at 222 by portable devices at the event and at 224 a user may select particular content to be displayed and/or output as sound by the portable device.

Additionally, the various embodiments described herein are not limited for use in connection with particular systems or for receiving signals from specific sources, but may receive signals from other sources, such as, for example, the system for distributing audio and/or video signals described in U.S. Pat. No. 6,578,203, the entire disclosure of which is hereby incorporated by reference herein.

Further, the portable device, including the portable receiver unit 65 or 180, may be any device having a receiver configured to receive signals from the various embodiments of the present invention described herein. For example, the wireless portable device may be any suitable device capable of displaying images or outputting sounds based on signals transmitted from the system 50. These devices include, but are not limited to, laptop computers, electronic tablet devices, cellular telephones, personal digital assistants (PDAs) and/or other handheld portable devices having wireless capabilities. Further examples of these devices, include, but are not limited to, the device described in co-pending U.S. application entitled "Electronic Handheld Audio/Video Receiver and Listening/Viewing Device" filed on Apr. 18, 2001 and having Ser. No. 09/837,128, the entire disclosure of which is hereby incorporated by reference herein; the device described in co-pending U.S. application "Audio/Video System and Method Utilizing a Head Mounted Apparatus with Noise Attenuation" filed on Aug. 31, 1999 and having Ser. No. 09/386,613, the entire disclosure of which is hereby incorporated by reference herein; and the device described in co-pending U.S. application entitled "Electronic Handheld Audio/Video Receiver and Listening/Viewing Device" filed on Jul. 30, 2003 and having Ser. No. 10/630,069, the entire disclosure of which is hereby incorporated by reference herein.

Thus, in operation, various embodiments of the present invention allow a user at an event to select and view and/or listen to event content or non-event content from a plurality of sources. The plurality of sources may be located locally at the event or remote from the event.

It should be noted that the component parts of the various embodiments may be modified as desired or needed. For example, the interface may be modified to accommodate signals from additional or different sources.

While the invention has been described in terms of various specific embodiments, those skilled in the art will recognize that the invention can be practiced with modification.

What is claimed is:

1. A system for providing content for access by a portable device at a local sporting event, the system comprising:
    a central facility to receive signals from a plurality of sources, the plurality of sources located at the local sporting event and at multiple remote sporting events, the signals defining video event content associated with the local and remote sporting events, the central facility including a processor for processing the received signals to generate combined signals including the video event content from the plurality of sources, the central facility including a user interface coupled to the processor to receive inputs from a user that instruct the processor to mix desired combinations of the video event signals to generate the combined signals; and
    multiple broadcast antenna located to service different regions, at least one of the antenna servicing the local event, the antenna being connected to the central facility to receive the combined signals, the antenna to wirelessly transmit the combined signals to a plurality of portable devices at the local event, the combined signals configured to allow a user to select individually the video event content of interest to view on one of the portable devices, the central facility designating which of the antenna are to receive which of the combined signals, the central facility including a router to route the combined signals to one or more of the antenna that are designated to receive the combined signals.

2. A system in accordance with claim 1, further comprising a monitoring system configured to view content from the plurality of sources.

3. A system in accordance with claim 1, further comprising a quality control system configured to determine a quality level for the received signals.

4. A system in accordance with claim 3, wherein the quality control system comprises at least one signal analyzer configured to determine a level of quality assurance/quality control (QA/QC) for the received signals.

5. A system in accordance with claim 1, further comprising at least one multiplexer configured to combine the received signals.

6. A system in accordance with claim 1, wherein the plurality of sources comprises at least one of over air television, event cameras, AM/FM radio, satellite, VCR/DVD, cable television, satellite television, and Internet.

7. A system in accordance with claim 1, wherein the processor is configured to select signals to combine based on signal selection criteria.

8. A system in accordance with claim 7, wherein the signal selection criteria is based on one of (i) spectator or regional preferences, (ii) a geographic location of a source of the signals, and (iii) predetermined criteria.

9. A system in accordance with claim 7, wherein the signal selection criteria is based on at least one of time of day, type of event and content variety.

10. A system in accordance with claim 1, wherein the combined signals further comprise at least one audio signal.

11. A system in accordance with claim 1, further comprising a plurality of frequency modulators configured to modulate the received signals on different frequencies.

12. The system of claim 1, wherein the central facility categorizes the video event content based upon one of a geographic location of the corresponding sporting event, and a type of the sporting event.

13. The system of claim 1, wherein the central facility conveys a first combined signal to at least a first antenna and a second combined signal to at least a second antenna, the first and second combined signals including at least one difference in the video event content.

14. The system of claim 1, wherein the central facility provides conditional access to the combined signals such that only authorized portable devices are able to display the video event content.

15. The system of claim 1, wherein the central facility provides, over a first channel, live continuous video event content from a single one of the sources at the local event being attended by a first user with a first portable device, the central facility providing, over a second channel, the video event content from multiple remote sporting events that are remote from the local event being attended by the first user, the first user selecting between the first and second channels on the first portable device.

16. A method for providing content for access by a portable device at a local sporting event, the method comprising:
   receiving, at a central facility, signals from a plurality of sources, the plurality of sources being located at a local sporting event and at multiple remote sporting events, the signals defining video event content associated with the local and remote sporting events;
   receiving, at a user interface of the central facility, user inputs from a user to designate desired combinations of the video event signals;
   processing the received signals at a processor of the central facility, based on the user inputs of the desired combinations, to generate combined signals of the video event content from the plurality of sources at the local and remote sporting events;
   connecting the central facility to multiple broadcast antenna that are located to service different regions, at least one of the antenna servicing the local sporting event;
   designating, at the central facility, which of the antenna are to receive which of the combined signals;
   routing the combined signals to one or more of the antenna that are designated to receive the combined signals;
   wirelessly transmitting, from the designated antenna, the combined signals to a plurality of portable devices at the local event; and
   configuring the combined signals to allow users of the portable devices to select individually the video event content of interest to view on one of the portable devices receiving the combined signals.

17. A method in accordance with claim 16, wherein the combined signals further comprise at least one audio signal.

18. A method in accordance with claim 16, wherein the combined signals are configured to allow selection of content by the at least one portable device.

19. A method in accordance with claim 16, further comprising selecting additional content to include in the combined signals.

20. A method in accordance with claim 16, wherein the determining comprises selecting signals to combine based on signal selection criteria including at least one of (i) spectator or regional preferences, (ii) a geographic location of a source of the signals, and (iii) predetermined criteria.

21. The method of claim 16, further comprising categorizing the video event content based upon one of a geographic location of the corresponding sporting event, and a type of the sporting event.

22. The method of claim 16, wherein the routing includes routing a first combined signal to at least a first antenna and routing a second combined signal to at least a second antenna, the first and second combined signals including at least one difference in the video event content.

23. The method of claim 16, further comprising providing conditional access to the combined signals such that only authorized portable devices are able to display the video event content.

24. The method of claim 16, further comprising:
   conveying, from the central facility, over a first channel, live continuous video event content from a single one of the sources at a local event being attended by a first user with a first portable device; and
   conveying, from the central facility, over a second channel, the video event content from multiple remote sporting events that are remote from the local event being attended by the first user, the first user selecting between the first and second channels on the first portable device.

* * * * *